United States Patent
Nakagawa et al.

(10) Patent No.: US 8,042,643 B2
(45) Date of Patent: Oct. 25, 2011

(54) SADDLE-RIDE TYPE VEHICLE

(75) Inventors: Hideaki Nakagawa, Saitama (JP);
Kotaro Fujiyama, Saitama (JP);
Daisuke Kuramochi, Saitama (JP);
Junichi Sakamoto, Saitama (JP);
Satoru Ikami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/702,852

(22) Filed: Feb. 9, 2010

(65) Prior Publication Data

US 2010/0207345 A1   Aug. 19, 2010

(30) Foreign Application Priority Data

Feb. 18, 2009  (JP) ................................. 2009-035198
Oct. 27, 2009  (JP) ................................. 2009-246558

(51) Int. Cl.
*B62D 21/00* (2006.01)

(52) U.S. Cl. ...................................... 180/312
(58) Field of Classification Search .................. 180/210, 180/219, 227, 311, 312
See application file for complete search history.

(56) References Cited

U.S. PATENT DOCUMENTS

| 3,917,313 | A | * | 11/1975 | Smith et al. | 280/284 |
| 4,408,674 | A | * | 10/1983 | Boyesen | 180/227 |
| 4,460,057 | A | | 7/1984 | Kohyama | |
| 4,621,706 | A | * | 11/1986 | Boyesen | 180/227 |
| 4,735,277 | A | * | 4/1988 | Prince | 180/227 |
| 6,290,017 | B1 | * | 9/2001 | Ito | 180/227 |
| 6,679,647 | B2 | * | 1/2004 | Hixon | 403/349 |

FOREIGN PATENT DOCUMENTS

JP   58-20581 A   2/1983

* cited by examiner

*Primary Examiner* — Paul N Dickson
*Assistant Examiner* — Robert A Coker
(74) *Attorney, Agent, or Firm* — Birch, Stewart, Kolasch & Birch, LLP

(57) ABSTRACT

A saddle-ride type vehicle with a swing arm swingably supported on a body frame. A shock absorber is connected to the body frame and the swing arm for applying a damping force. A shock absorber support member is suspended to the body frame in a vehicle width direction for supporting an upper end of the shock absorber. The shock absorber is supported on a central portion in the vehicle width direction of the shock absorber support member. The central portion in the vehicle width direction of the shock absorber support member is formed in a U-shape that is open at a lower side in a cross section taken along a longitudinal direction of the vehicle. An upper surface and a lower surface of the shock absorber support member are curved wherein a central portion lies above the end portion in the vehicle width direction.

20 Claims, 13 Drawing Sheets

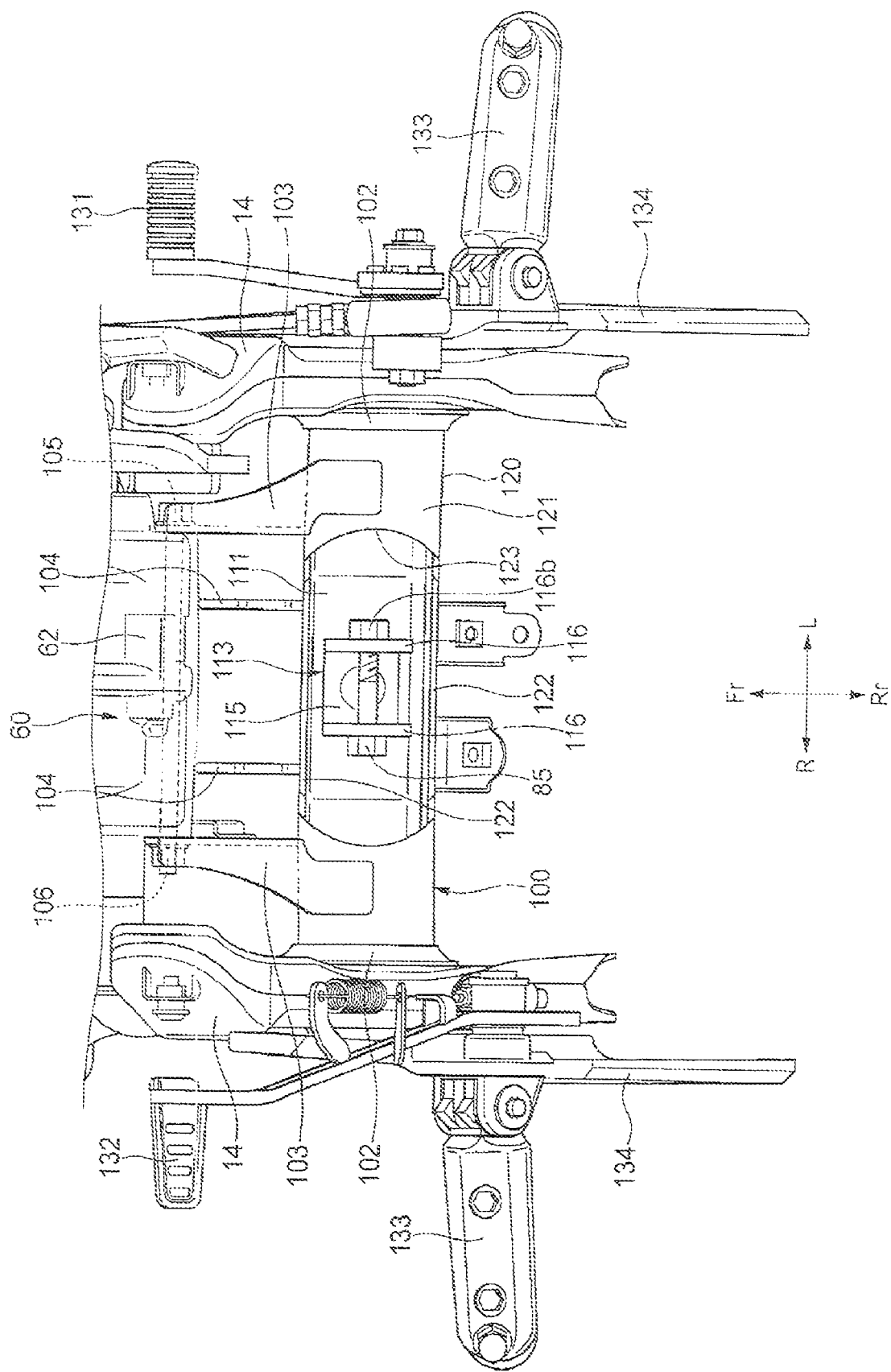

SADDLE-RIDE TYPE VEHICLE

CROSS-REFERENCE TO RELATED APPLICATIONS

The present application claims priority under 35 USC 119 to Japanese Patent Application No. 2009-035198 filed on Feb. 18, 2009 and Japanese Patent Application No. 2009-246558 filed on Oct. 27, 2009 the entire contents of which are hereby incorporated by reference.

BACKGROUND OF THE INVENTION

1. Field of the Invention

The present invention relates to a saddle-ride type vehicle. More particularly, a rear-wheel suspension device for a saddle-ride type vehicle.

2. Description of Background Art

A saddle-ride type vehicle is known wherein a cross member (shock absorber support member) constituting the body frame is formed in a semicircular cylindrical shape in cross section. The upper end of a rear shock absorber is supported within the semicircle of this cross member. See, for example, JP-A No. S58-020581.

In the case of the saddle-ride type vehicle according to JP-A No. S58-020581, since the upper end of the rear shock absorber is supported within the semicircle of the cross member, the shock absorber length can be secured. However, since the cross member has a semicircular cylindrical shape in cross section, in the case of larger saddle-ride type vehicles, there is a desire for a structure that provides both improved strength and reduced weight of the cross member.

SUMMARY AND OBJECTS OF THE INVENTION

According to an embodiment of the present invention, a saddle-ride type vehicle is provided that makes it possible to improve the strength of a shock absorber support member, and also makes it possible to reduce the weight of the shock absorber support member.

According to an embodiment of the present invention, a saddle-ride type vehicle includes a body frame formed as a left and right pair in a vehicle width direction, a swing arm with one end swingably supported on the body frame, a rear wheel rotatably supported on the swing arm, a shock absorber connected to the body frame and the swing arm for applying a damping force to the swinging of the swing arm, and a shock absorber support member that is provided so as to be suspended to the body frame in a vehicle width direction and for supporting an upper end of the shock absorber. The shock absorber is supported on a central portion in the vehicle width direction of the shock absorber support member. A central portion in the vehicle width direction of the shock absorber support member is formed in a U-shape that is open at a lower side in a cross section taken along a longitudinal direction of the vehicle. An upper surface and a lower surface of the shock absorber support member are each formed so as to be curved in such a way that its central portion in the vehicle width direction lies above right and left end portions in the vehicle width direction.

According to an embodiment of the present invention, an engine is arranged in front of the shock absorber support member. The engine is supported by an engine support portion provided to the shock absorber support member.

According to an embodiment of the present invention, the shock absorber support member is formed as a two-piece vertical-split joint structure, the engine support portion is provided as a left and right pair across a shock absorber support portion of the shock absorber support member, and an opening is provided in a portion of a lower surface of the shock absorber support member which is located on a central side in the vehicle width direction with respect to the engine support portion.

According to an embodiment of the present invention, an engine fastening portion that fastens the engine and the engine support portion together is arranged below the shock absorber support portion.

According to an embodiment of the present invention, the shock absorber support member is formed by arranging a pair of plate-like members so as to be spaced apart in the longitudinal direction of the vehicle, an upper plate-like member is coupled so as to be suspended between upper portions of the pair of plate-like members in the longitudinal direction of the vehicle, and a recess having a substantially U-shape in a top view of the vehicle is formed at each of right and left end portions in the vehicle width direction of the upper plate-like member.

According to an embodiment of the present invention, in a side view of the vehicle, a shock absorber fastening portion that fastens the shock absorber and the shock absorber support member together faces outwards through the recess.

According to an embodiment of the present invention, the pair of plate-like members are coupled to the body frame via a trapezoidal plate-like member having a long side provided at a lower side of a vehicle body, and a coupling distance between a coupling portion of the pair of plate-like members and the trapezoidal plate-like member and a coupling portion of the trapezoidal plate-like member and the body frame in a lower side of the trapezoidal plate-like member is set larger than a coupling distance between a coupling portion of the pair of plate-like members and the trapezoidal plate-like member and a coupling portion of the trapezoidal plate-like member and the body frame in an upper side of the trapezoidal plate-like member.

According to an embodiment of the present invention, the shock absorber support member is formed by arranging a pair of plate-like members so as to be spaced apart in the longitudinal direction of the vehicle, an upper plate-like member is coupled so as to be suspended between upper portions of the pair of plate-like members in the longitudinal direction of the vehicle, and right and left end portions in the vehicle width direction of the upper plate-like member extends down to a lower end of each of the plate-like members.

According to an embodiment of the present invention, a central portion in the vehicle width direction of the shock absorber support member is formed in a U-shape that is open at a lower side in a cross section taken along a longitudinal direction of the vehicle, an upper surface and a lower surface of the shock absorber support member are each formed so as to be curved in such a way that its central portion in the vehicle width direction lies above right and left end portions in the vehicle width direction, and the shock absorber is supported on a central portion in the vehicle width direction of the shock absorber support member. Thus, since load applied to the shock absorber support member can be received by a shear stress and a tensile force, the strength of the shock absorber support member can be improved. Also, it is possible to prevent an increase in weight due to strength improvement, thereby achieving a reduction in the weight of the shock absorber support member.

According to an embodiment of the present invention, an engine is arranged in front of the shock absorber support member, and the engine is supported by an engine support portion provided to the shock absorber support member. Thus, load applied to the shock absorber support member can be borne on the engine side, thereby making it possible to achieve a further reduction in the weight of the shock absorber support member.

According to an embodiment of the present invention, the shock absorber support member is formed as a two-piece vertical-split joint structure, the engine support portion is provided as a left and right pair across a shock absorber support portion of the shock absorber support member, and an opening is provided in a portion of a lower surface of the shock absorber support member which is located on a central side in the vehicle width direction with respect to the engine support portion. Thus, the rigidity of the portion of the shock absorber support member between the pair of left and right engine support portions can be improved by using the engine, and a further reduction in the weight of the shock absorber support member can be achieved.

According to an embodiment of the present invention, an engine fastening portion that fastens the engine and the engine support portion together is arranged below the shock absorber support portion. Thus, the compression load on the shock absorber can be transmitted to the engine side by means of the tension load on the engine support portion, thereby achieving a reduction in the weight of the engine support portion.

According to an embodiment of the present invention, since the shock absorber support member is formed by arranging a pair of plate-like members so as to be spaced apart in the longitudinal direction of the vehicle, the shock absorber support member can be fabricated easily, thereby making it possible to achieve improved productivity for the shock absorber support member. Also, an upper plate-like member is coupled so as to be suspended between upper portions of the pair of plate-like members in the longitudinal direction of the vehicle, and a recess having a substantially U-shape in a top view of the vehicle is formed at each of right and left end portions in the vehicle width direction of the upper plate-like member. Thus, it is possible to mitigate concentration of stress applied to the coupling portion at each of the right and left end portions in the vehicle width direction of the upper plate-like member, and impart a gentle stress distribution to the coupling surface between the pair of plate-like members and the upper plate-like member. This makes it possible to prevent an increase in the size of the upper plate-like member, and achieve both securing of strength and weight reduction of the shock absorber support member.

According to an embodiment of the present invention, in a side view of the vehicle, a shock absorber fastening portion that fastens the shock absorber and the shock absorber support member together faces outwards through the recess. Thus, it is possible to access the shock absorber fastening portion from the sides of the vehicle, thereby facilitating access of tools to the shock absorber fastening portion. Since fastening in the vertical direction becomes unnecessary, there is no fastening portion that projects upwards from the upper surface of the shock absorber support member. Thus, the shock absorber length can be set large, and the vehicle can be made compact in the vertical direction.

According to an embodiment of the present invention, the pair of plate-like members are coupled to the body frame via a trapezoidal plate-like member having a long side provided at a lower side of a vehicle body. Thus, it is possible to secure a large coupling length with the body frame as compared with the case in which the pair of plate-like members are directly coupled to the body frame. This makes it possible to disperse the load applied to the body frame, thereby achieving a weight reduction on the body frame side. In addition, a coupling distance between a coupling portion of the pair of plate-like members and the trapezoidal plate-like member and a coupling portion of the trapezoidal plate-like member and the body frame in a lower side of the trapezoidal plate-like member is set larger than a coupling distance between a coupling portion of the pair of plate-like members and the trapezoidal plate-like member and a coupling portion of the trapezoidal plate-like member and the body frame in an upper side of the trapezoidal plate-like member. Thus, concentration of stress can be avoided, thereby achieving a weight reduction on the body frame side.

According to an embodiment of the present invention, an upper plate-like member is coupled so as to be suspended between upper portions of the pair of plate-like members in the longitudinal direction of the vehicle, and right and left end portions in the vehicle width direction of the upper plate-like member extends down to a lower end of each of the plate-like members. Thus, it is possible to mitigate a concentration of stress applied to the coupling portion at each of the right and left end portions in the vehicle width direction of the upper plate-like member, and impart a gentle stress distribution to the coupling surface between the pair of plate-like members and the upper plate-like member. This makes it possible to prevent an increase in the size of the upper plate-like member, and achieve both an increase in strength and a reduction in weight of the shock absorber support member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 is a bottom view of the vicinity of the cross member shown in FIG. 10.

DETAILED DESCRIPTION OF THE PREFERRED EMBODIMENTS

Hereinbelow, embodiments of a saddle-ride type vehicle according to the present invention will be described in detail with reference to the drawings. It should be noted that the drawings are to be viewed in the direction of reference signs. In the following description, front/rear, left/right, and up/down are directions as viewed from the rider, and the front, rear, left, right, upward, and downward sides of the vehicle are respectively represented as Fr, Rr, L, R, U, and D.

Referring to FIGS. 1 to 7, a saddle-ride type vehicle according to a first embodiment of the present invention will be described.

Figure 1:
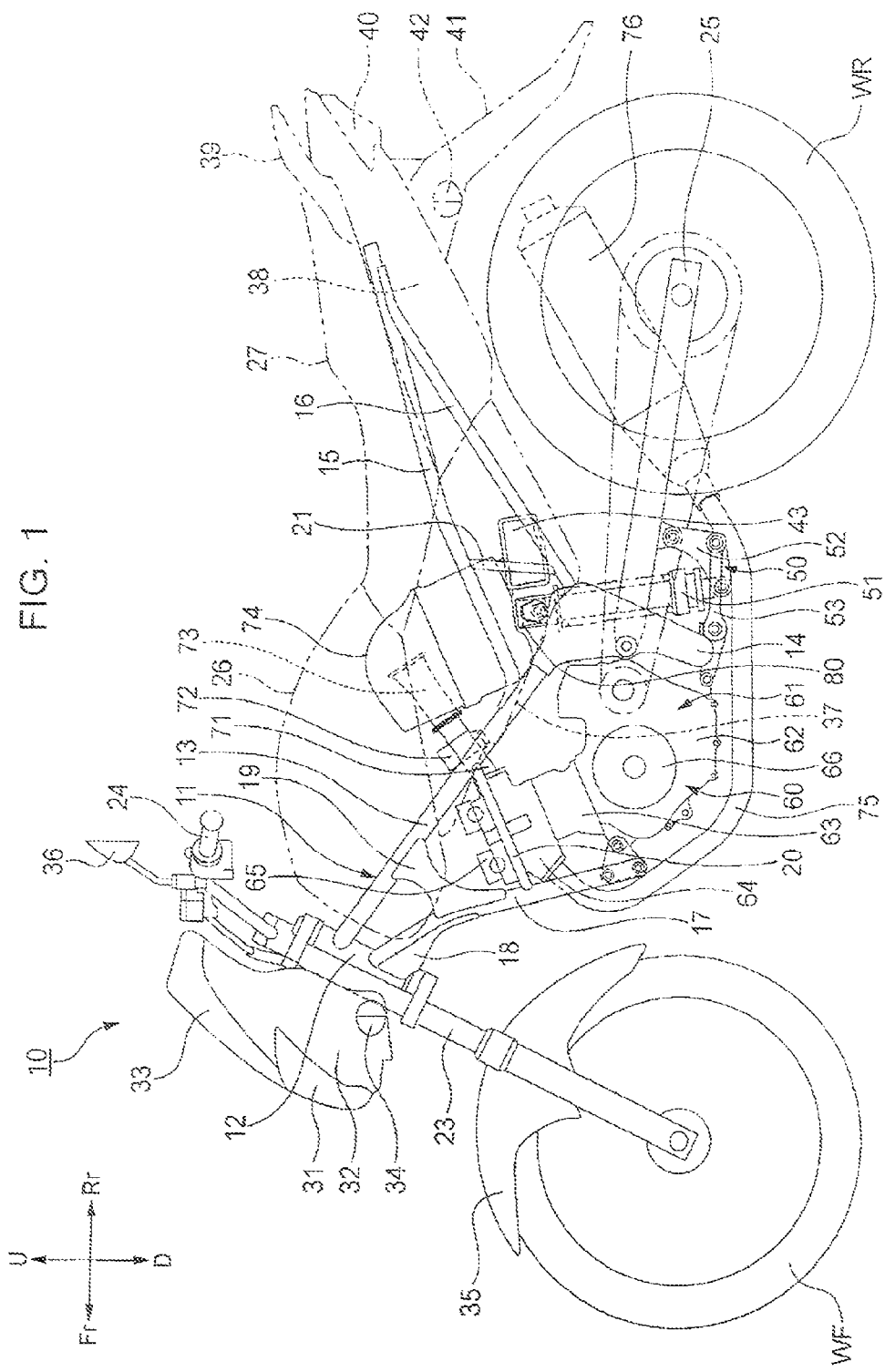
FIG. 1 is a left side view illustrating a saddle-ride type vehicle according to a first embodiment of the present invention.

In a motorcycle (saddle-ride type vehicle) 10 according to this embodiment, as shown in FIG. 1, a body frame 11 includes a head pipe 12 provided at the front end, a pair of left and right main frames 13 which extend rearwards and downwards from the head pipe 12, a pair of left and right pivot plates 14 which are connected to the rear end portions of the pair of left and right main frames 13, a pair of left and right seat frames 15 which are connected to the intermediate portions of the pair of left and right main frames 13 and extend rearwards and upwards and a pair of left and right sub-frames 16 which are connected to the pivot plates 14 and extend rearwards and upwards. Rear end portions of the pair of left and right sub-frames 16 are connected to the rear end portions of the seat frames 15. A pair of left and right down tubes 17 extend rearwards and downwards from the head pipe 12 with a pair of left and right gussets 18 which are coupled to the rear portion of the head pipe 12 and the front portions of the down tubes 17 in order to provide reinforcement around the head pipe 12. A pair of left and right reinforcing frames 19, 20 are connected between the main frames 13 and the down tubes 17 with a pair of left and right reinforcing frames 21 which connect between the seat frames 15 and the sub-frames 16, and a cross member 80 serving as a shock absorber support member which connects between the upper portions of the pair of left and right pivot plates 14 in the vehicle width direction. An engine 60 and a transmission 61 provided integrally to the rear portion of the engine 60 are attached to the main frames 13, the pivot plates 14, and the down tubes 17.

The motorcycle 10 includes a front fork 23 which is steerably supported on the head pipe 12, a front wheel WF which is rotatably supported on the lower end portion of the front fork 23, a handlebar 24 for steering which is attached to the upper end portion of the front fork 23, a swing arm 25 which is swingably supported on the pivot plates 14, a rear wheel WR which is rotatably supported on the rear end portion of the swing arm 25, a rear-wheel suspension device 50 which swingably connects between the lower portion of the swing arm 25, the rear lower end portions of the pivot plates 14, and the cross member 80, a fuel tank 26 which is attached above the main frames 13, and a seat 27 which is attached in rear of the fuel tank 26 and above the seat frames 15.

It should be noted that in FIG. 1, a headlight 31 is provided together with a front cowl 32, a wind screen 33, a front blinker 34, a front fender 35, a side mirror 36, a side cowl 37, a rear cowl 38, a passenger grip 39, a tail light 40, a rear fender 41, a rear blinker 42, and an ABS device 43.

As shown in FIG. 1, the rear-wheel suspension device 50 includes a shock absorber 51 whose upper end portion is swingably attached to the cross member 80, a substantially triangular first link 52 which swingably connects between the lower end portion of the shock absorber 51 and the lower intermediate portion of the swing arm 25, and a second link 53 which swingably connects between the first link 52 and the rear lower end portions of the pivot plates 14.

The engine 60 is a single-cylinder engine and, as shown in FIG. 1, its outer shell mainly includes a crankcase 62, a cylinder block 63 attached to the front upper end portion of the crankcase 62, a cylinder head 64 attached to the upper end portion of the cylinder block 63, a cylinder head cover 65 which covers the upper opening of the cylinder head 64, an ACG (generator) cover 66 which covers an opening in the left side surface of the crankcase 62, and an unillustrated clutch cover which covers an opening in the right side surface of the crankcase 62.

As shown in FIG. 1, a throttle body 72 is connected via an intake pipe 71 to an unillustrated intake port formed in the rear portion of the cylinder head 64. An air cleaner device 74 is connected via a connecting tube 73 to the upstream end of the throttle body 72. A muffler 76 is connected via an exhaust pipe 75 to an unillustrated exhaust port formed in the front portion of the cylinder head 64.

As shown in FIGS. 2 to 7, the cross member 80 includes a pair of plate-like members 81 which are provided so as to be suspended between the pair of left and right pivot plates 14 in the vehicle width direction and are arranged so as to be spaced apart in the longitudinal direction of the vehicle, an upper plate-like member 82 which is coupled so as to be suspended between the upper portions of the pair of plate-like members 81 in the longitudinal direction of the vehicle, a shock absorber bracket 83 having a substantially inverted U-shaped cross section in the vehicle width direction which is coupled to the center in the vehicle width direction of the lower surface of the upper plate-like member 82 and supports the upper end portion of the shock absorber 51, and a trapezoidal plate-like member 84 which is coupled to each of the end portions 81e in the vehicle width direction of the pair of plate-like members 81 and is coupled to the inner side in the vehicle width direction of the pivot plates 14. In this embodiment, the cross member 80 is provided separately from the body frame 11. The pair of plate-like members 81 are arranged in parallel with respect to the direction of expansion and contraction of the shock absorber 51. It should be noted that in the drawings, a cross member 45 is provided together with an engine bracket 46.

Figure 5:
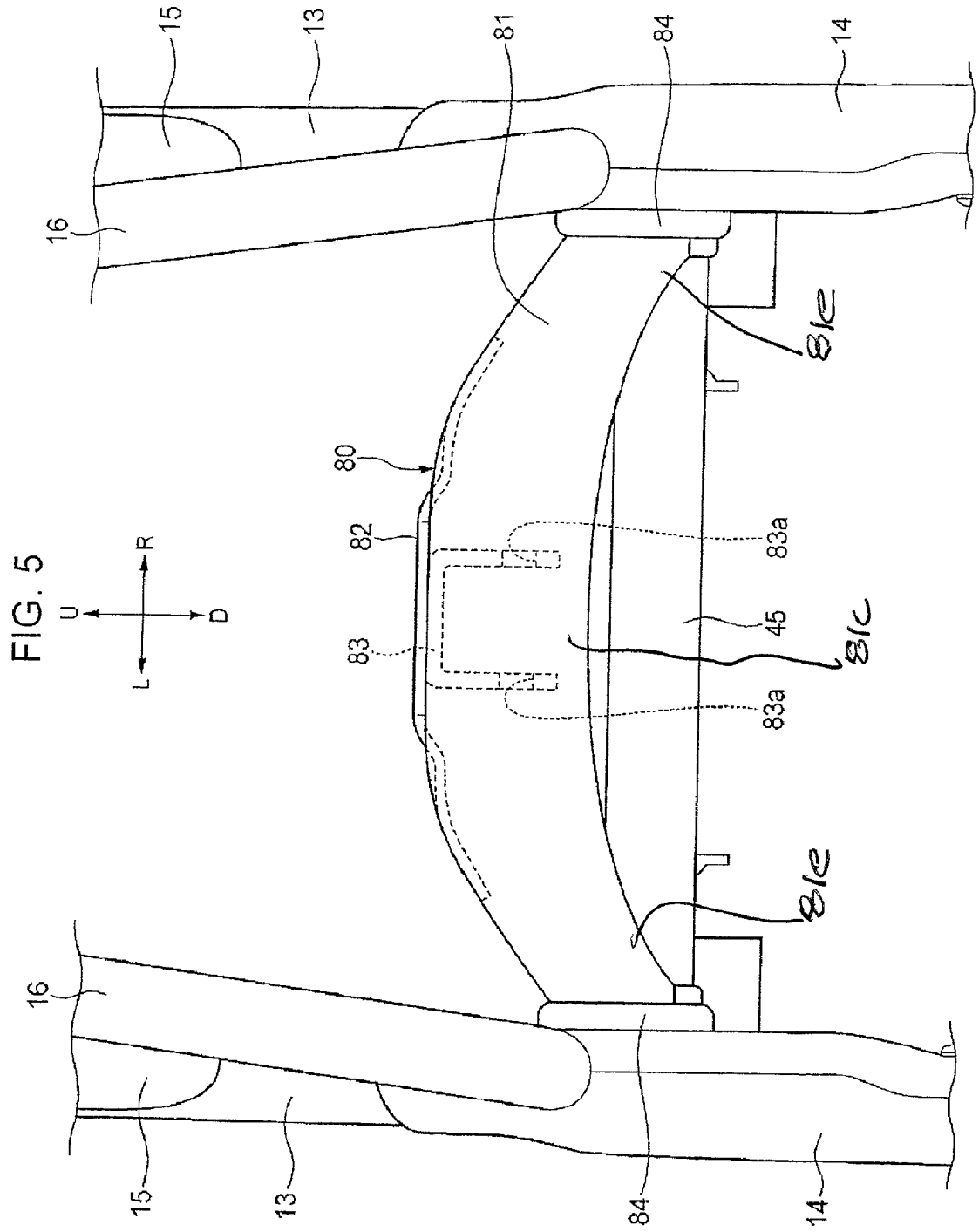
FIG. 5 is a rear view of the vicinity of the cross member shown in FIG. 2.
Figure 6:
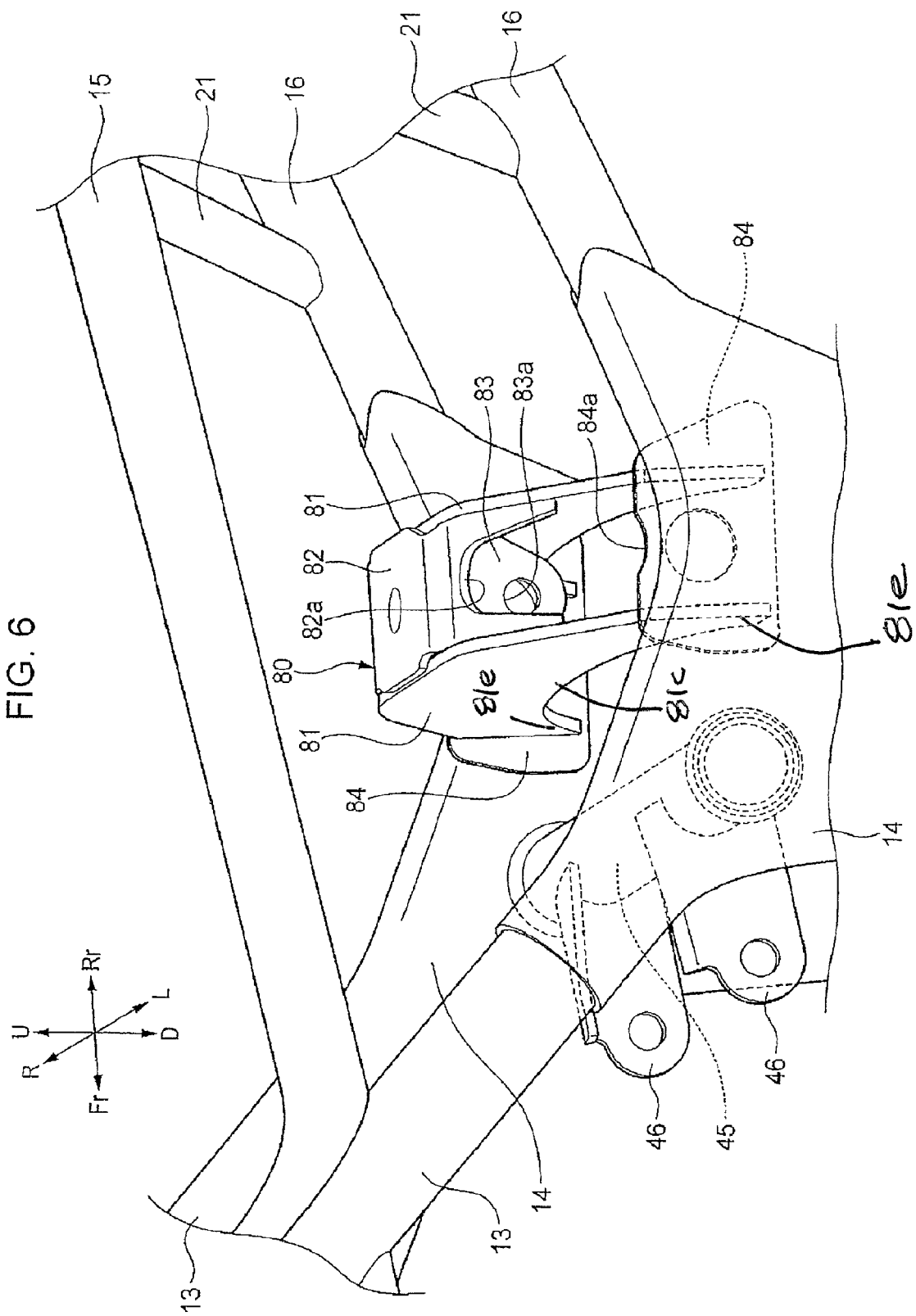
FIG. 6 is a perspective view of the vicinity of the cross member shown in FIG. 2 as seen from above and from the left front.
Figure 7:
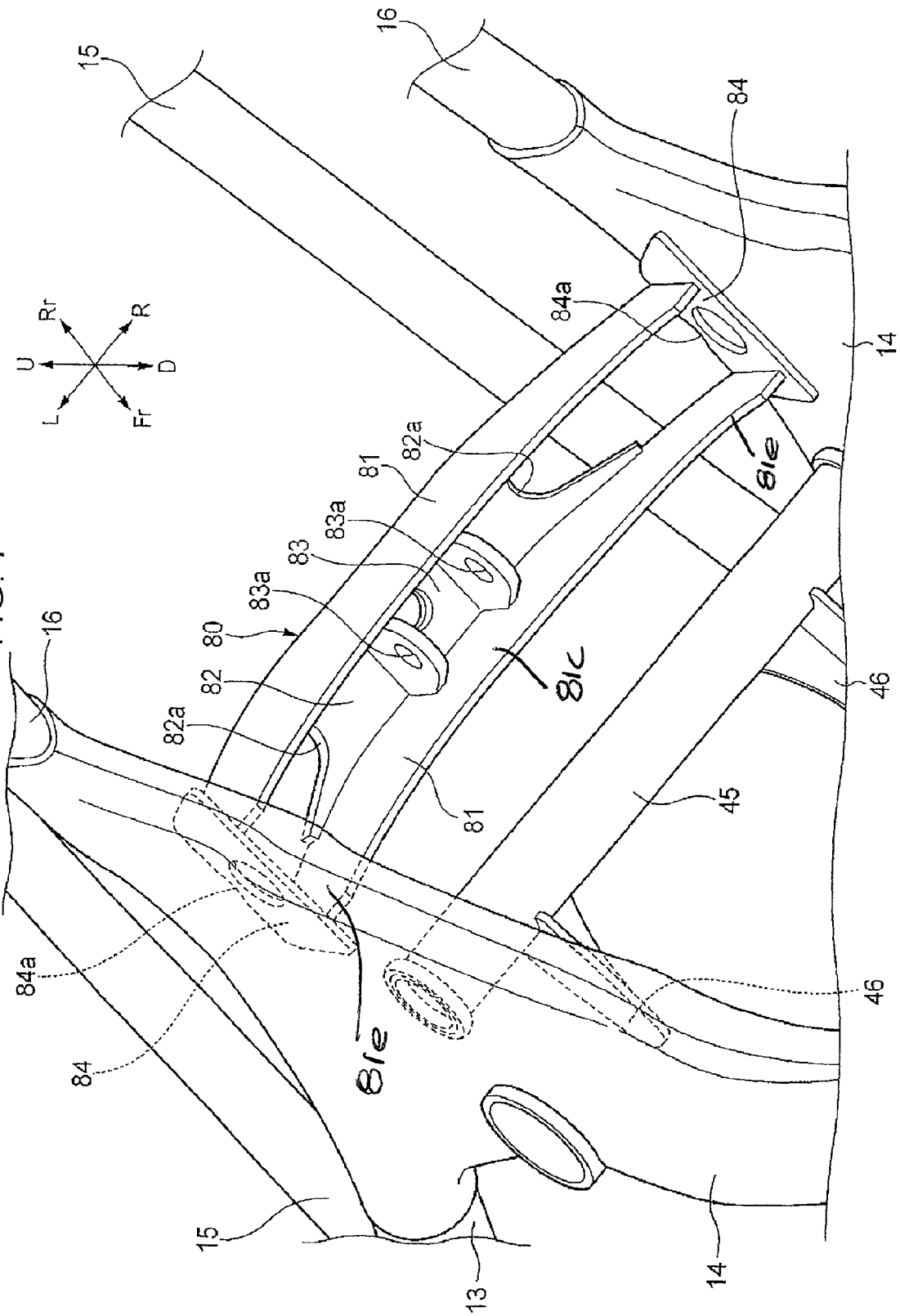
FIG. 7 is a perspective view of the vicinity of the cross member shown in FIG. 2 as seen from below and from the left rear.

In this embodiment, as shown in FIGS. 5 to 7, in a cross section taken along the longitudinal direction of the vehicle, the central portion in the vehicle width direction of the cross member 80 is formed in a U-shape that is open at the lower side by the pair of plate-like members 81 and the upper plate-like member 82. Also, the upper and lower surfaces of the pair of plate-like members 81 are each formed so as to be curved in such a way that its central portion 81c in the vehicle width direction lies above the right and left end portions 81e in the vehicle width direction.

Figure 2:
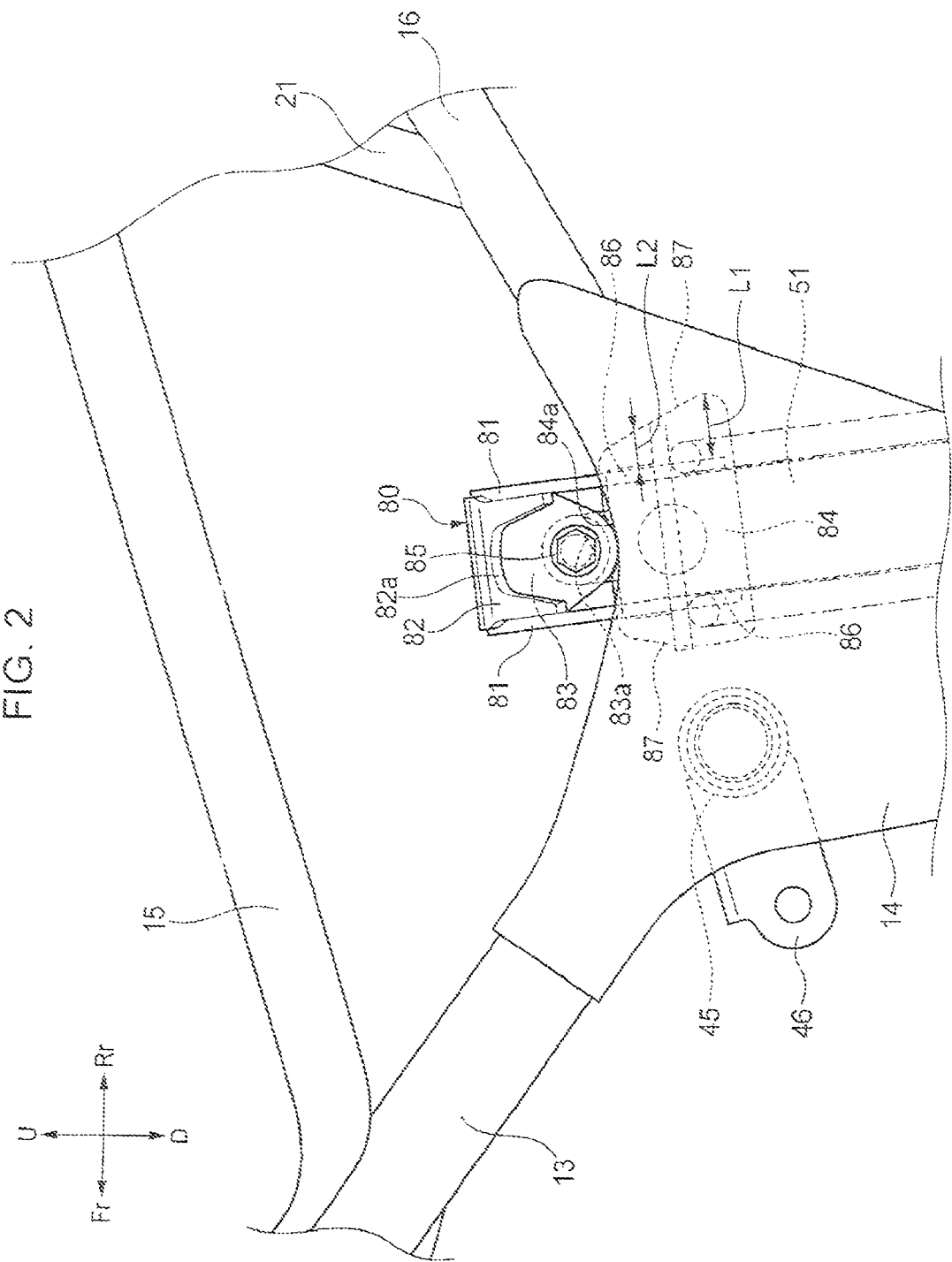
FIG. 2 is a left side view of the vicinity of the cross member shown in FIG. 1.
Figure 3:
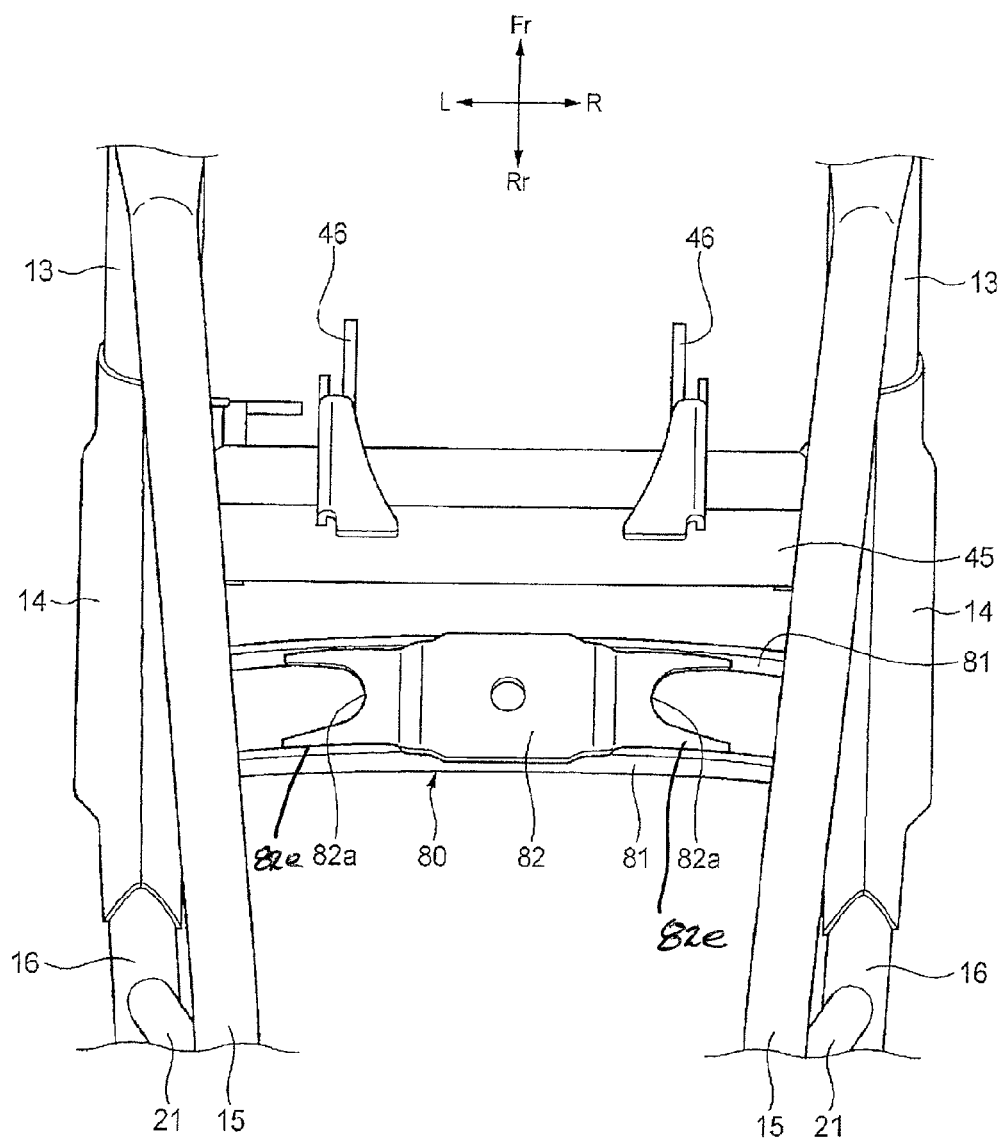
FIG. 3 is a top view of the vicinity of the cross member shown in FIG. 2.
Figure 4:
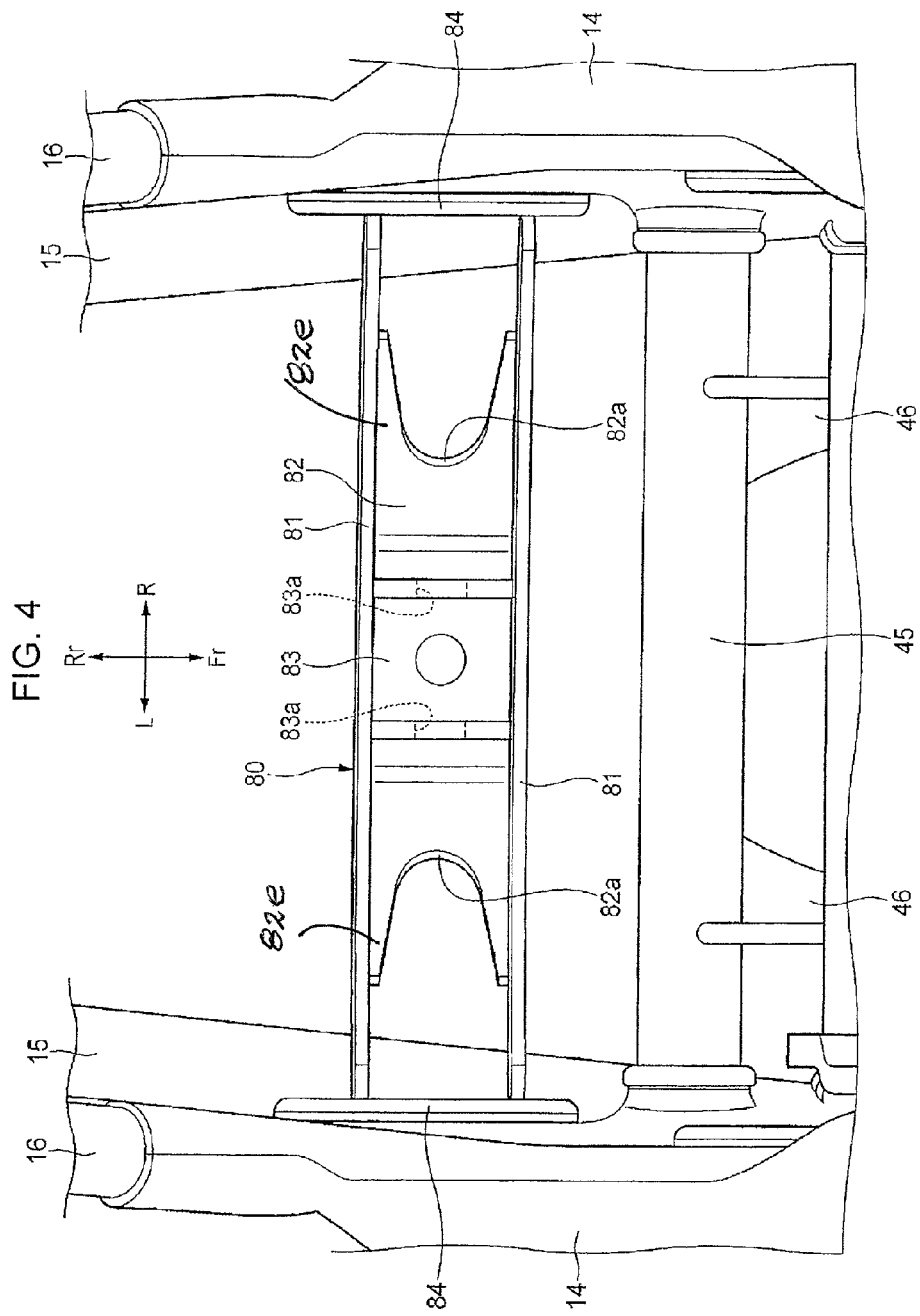
FIG. 4 is a bottom view of the vicinity of the cross member shown in FIG. 2.

In this embodiment, as shown in FIGS. 2 to 4, a recess 82a having a substantially U-shape in the top view and side view of the vehicle is formed at each of the right and left end portions 82e in the vehicle width direction of the upper plate-like member 82. Thus, in the side view of the vehicle, a fastening bolt 85, which is a shock absorber fastening portion that fastens the upper end portion of the shock absorber 51 and the shock absorber bracket 83 of the cross member 80 together, faces outwards via the recess 82*a* in the left side of the vehicle, and an unillustrated nut for threaded engagement with the fastening bolt 85 faces outwards via the recess 82*a* in the right side of the vehicle. Therefore, access of tools to the fastening bolt 85 and the unillustrated nut is facilitated.

As shown in FIGS. 4 to 7, in the shock absorber bracket 83, a through-hole 83*a* for the fastening bolt 85 to pass through is formed along the vehicle width direction.

In this embodiment, as shown in FIGS. 2 and 6, the trapezoidal plate-like member 84 is formed in the shape of a trapezoid having a long side provided at the lower side of the vehicle body. The coupling distance L1 between a coupling portion 86 of the pair of plate-like members 81 and the trapezoidal plate-like member 84 and a coupling portion 87 of the trapezoidal plate-like member 84 and the pivot plates 14 in the lower side of the trapezoidal plate-like member 84 is set larger than the coupling distance L2 between the coupling portion 86 of the pair of plate-like members 81 and the trapezoidal plate-like member 84 and the coupling portion 87 of the trapezoidal plate-like member 84 and the pivot plates 14 in the upper side of the trapezoidal plate-like member 84. As shown in FIG. 6, a recess 84*a* for facilitating access of tools to the above-mentioned fastening bolt 85 and unillustrated nut is formed along the upper side of the trapezoidal plate-like member 84.

As described above, according to the motorcycle 10 in this embodiment, the central portion in the vehicle width direction of the cross member 80 is formed in a U-shape that is open at the lower side in the cross section taken along the longitudinal direction of the vehicle, the upper and lower surfaces of the pair of plate-like members 81 are each formed so as to be curved in such a way that its central portion 81*c* in the vehicle width direction lies above the right and left end portions 81*e* in the vehicle width direction, and the shock absorber is supported on the central portion 81*c* in the vehicle width direction of the cross member 80. Thus, since load applied to the cross member 80 can be received by a shear stress and a tensile force, the strength of the cross member 80 can be improved. Also, it is possible to prevent an increase in weight due to strength improvement, thereby achieving a reduction in the weight of the cross member 80.

According to the motorcycle 10 in this embodiment, since the cross member 80 is formed by arranging the pair of plate-like members 81 so as to be spaced apart in the longitudinal direction of the vehicle, the cross member 80 can be fabricated easily, thereby making it possible to achieve improved productivity for the cross member 80. Also, the upper plate-like member 82 is coupled so as to be suspended between the upper portions of the pair of plate-like members 81 in the longitudinal direction of the vehicle, and the recess 82*a* having a substantially U-shape in the top view of the vehicle is formed at each of the right and left end portions 82*e* in the vehicle width direction of the upper plate-like member 82. Thus, it is possible to mitigate the concentration of stress applied to the coupling portion at each of the right and left end portions 82*e* in the vehicle width direction of the upper plate-like member 82, and impart a gentle stress distribution to the coupling surface between the pair of plate-like members 81 and the upper plate-like member 82. This makes it possible to prevent an increase in the size of the upper plate-like member 82, and achieve both securing of strength and weight reduction of the cross member 80.

According to the motorcycle 10 in this embodiment, in the side view of the vehicle, the fastening bolt 85 that fastens the shock absorber 51 and the support bracket 83 of the cross member 80 together faces outwards through the recess 82*a* in the upper plate-like member 82. Thus, it is possible to access the fastening bolt 85 from the sides of the vehicle, thereby facilitating access of tools to the fastening bolt 85. Since fastening in the vertical direction becomes unnecessary, there is no fastening portion that projects upwards from the upper surface of the cross member 80. Thus, the shock absorber length can be set large, and the vehicle 10 can be made compact in the vertical direction.

According to the motorcycle 10 in this embodiment, the pair of plate-like members 81 are coupled to the pivot plates 14 of the body frame 11 via the trapezoidal plate-like member 84 having a long side located at the lower side of the vehicle body. Thus, it is possible to secure a large coupling length with the pivot plates 14 as compared with the case in which the pair of plate-like members 81 are directly coupled to the pivot plates 14. This makes it possible to disperse the load applied to the pivot plates 14, thereby achieving a weight reduction on the body frame 11 side.

The coupling distance L1 between the coupling portion 86 of the pair of plate-like members 81 and the trapezoidal plate-like member 84 and the coupling portion 87 of the trapezoidal plate-like member 84 and the pivot plates 14 in the lower side of the trapezoidal plate-like member 84 is set larger than the coupling distance L2 between the coupling portion 86 of the pair of plate-like members 81 and the trapezoidal plate-like member 84 and the coupling portion 87 of the trapezoidal plate-like member 84 and the pivot plates 14 in the upper side of the trapezoidal plate-like member 84. Thus, the concentration of stress can be avoided, thereby achieving a weight reduction on the body frame 11 side.

Figure 8:
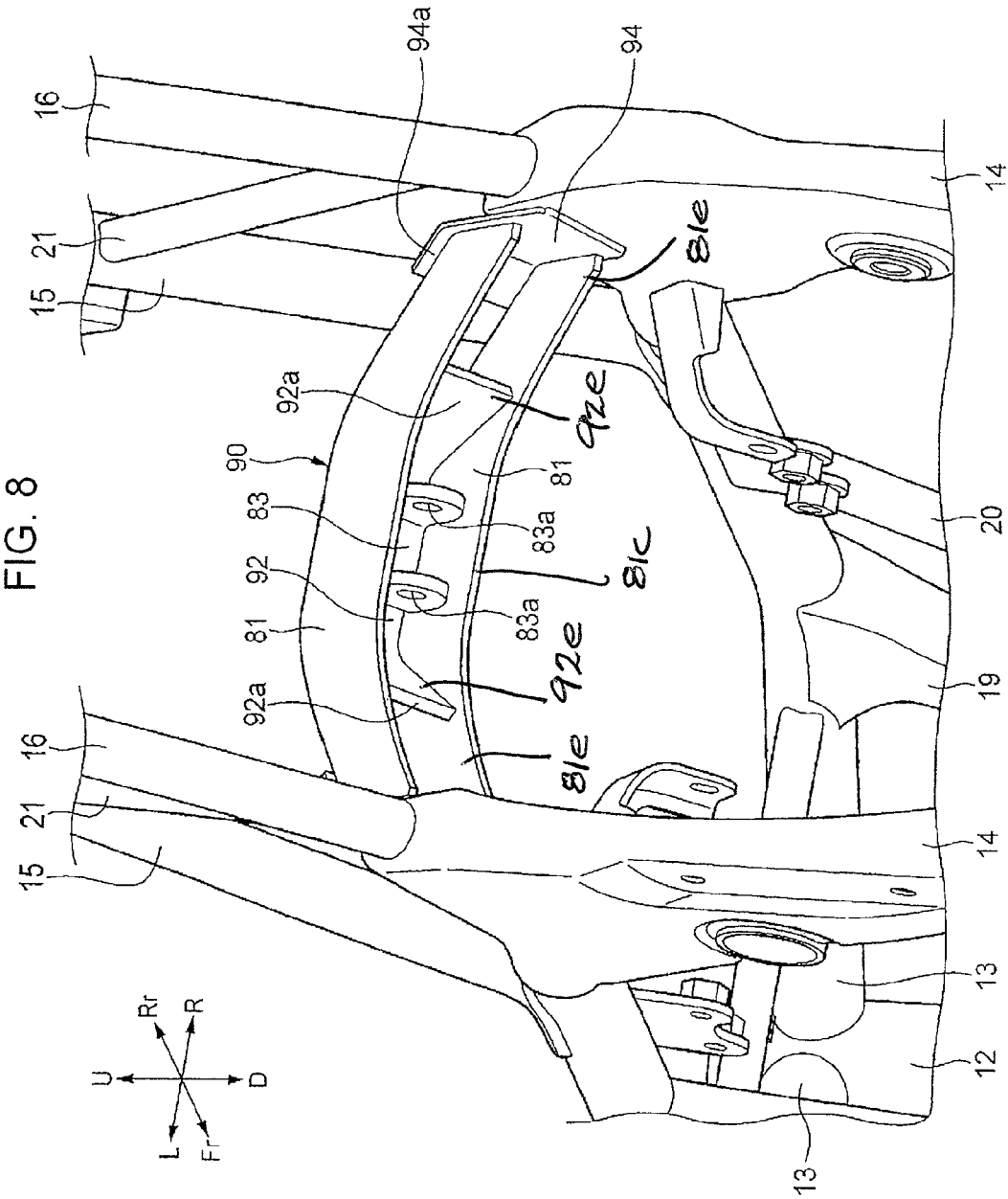
FIG. 8 is a perspective view illustrating a cross member of a saddle-ride type vehicle according to a second embodiment of the present invention.
Figure 9:
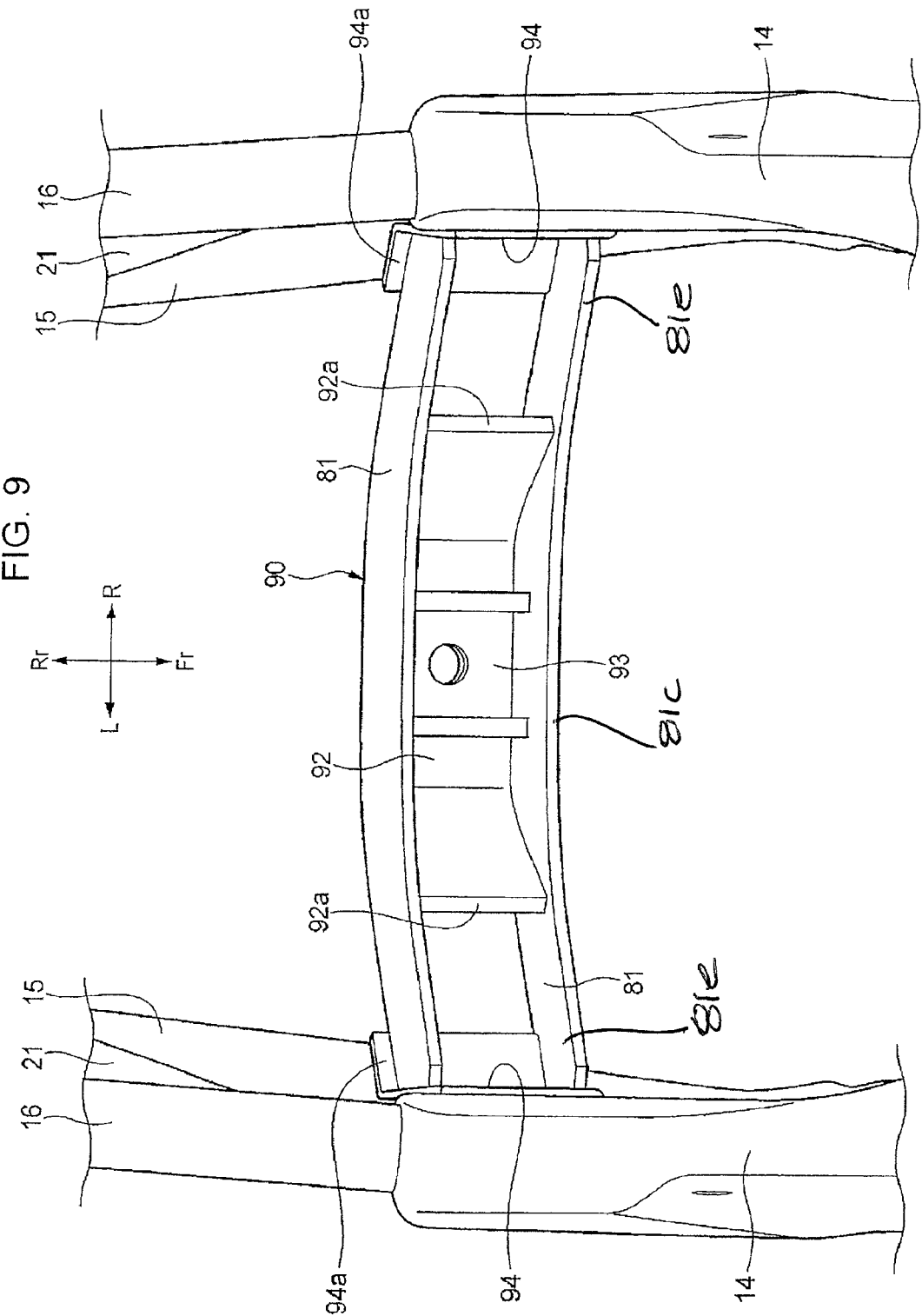
FIG. 9 is a bottom view of the vicinity of the cross member shown in FIG. 8.

Referring to FIGS. 8 and 9, a saddle-ride type vehicle according to a second embodiment of the present invention will be described. It should be noted that portions that are the same as or equivalent to those of the first embodiment are denoted by the same reference signs in the drawings and their description will be omitted or simplified.

The motorcycle 10 according to this embodiment uses a cross member (shock absorber support member) 90 instead of the cross member 80 according to the first embodiment. As shown in FIGS. 8 and 9, the cross member 90 includes the pair of plate-like members 81 which are provided so as to be suspended between the pair of left and right pivot plates 14 in the vehicle width direction and are arranged so as to be spaced apart in the longitudinal direction of the vehicle, an upper plate-like member 92 which is coupled so as to be suspended between the upper portions of the pair of plate-like members 81 in the longitudinal direction of the vehicle, the shock absorber bracket 83 having a substantially inverted U-shaped cross section which is coupled to the center in the vehicle width direction of the lower surface of the upper plate-like member 92 and supports the upper end portion of the shock absorber 51, and a rectangular plate-like member 94 which is coupled to each of the right and left end portions 81*e* in the vehicle width direction of the pair of plate-like members 81 and is coupled to the inner side in the vehicle width direction of the pivot plates 14.

In this embodiment, as shown in FIGS. 8 and 9, a bent portion 92*a* that is bent obliquely downwards is provided at each of the right and left end portions 92*e* in the vehicle width direction of the upper plate-like member 92. The right and left end portions 92*e* in the vehicle width direction of the bent portion 92*a* extend down to the lower end of each of the pair of plate-like members 81.

In this embodiment, as shown in FIGS. 8 and 9, a reinforcing portion 94*a* that lies along the upper surface at each of the right and left end portions 81*e* in the vehicle width direction of each of the pair of plate-like members 81 is provided at the upper end portion of each of the rectangular plate-like members 94. The reinforcing portion 94a is coupled to the upper surface at each of the right and left end portions 81e in the vehicle width direction of each of the pair of plate-like members 81.

As described above, according to the motorcycle 10 in this embodiment, each of the right and left end portions 92e in the vehicle width direction of the upper plate-like member 92 extends down to the lower end of each of the pair of plate-like members 81. Thus, it is possible to mitigate the concentration of stress applied to the coupling portion at each of the right and left end portions 92e in the vehicle width direction of the upper plate-like member 92, and impart a gentle stress distribution to the coupling surface between the pair of plate-like members 81 and the upper plate-like member 92. This makes it possible to prevent an increase in the size of the upper plate-like member 92, and achieve both an increase in strength and a reduction in weight of the cross member 90.

According to the motorcycle 10 in this embodiment, the reinforcing portion 94a provided at the upper end portion of each of the rectangular plate-like members 94 is coupled to the upper surface at the corresponding one of the right and left end portions 81e in the vehicle width direction of each of the pair of plate-like members 81. Thus, the coupling between the pair of plate-like members 81 and the rectangular plate-like member 94 can be made strong, thereby improving the rigidity of the cross member 90.

Otherwise, the configuration and operational effects of the second embodiment are the same as those according to the first embodiment mentioned above.

Referring to FIGS. 10 to 13, a saddle-ride type vehicle according to a third embodiment of the present invention will be described. It should be noted that portions that are the same as or equivalent to those of the first embodiment are denoted by the same reference signs in the drawings and their description will be omitted or simplified.

Figure 10:
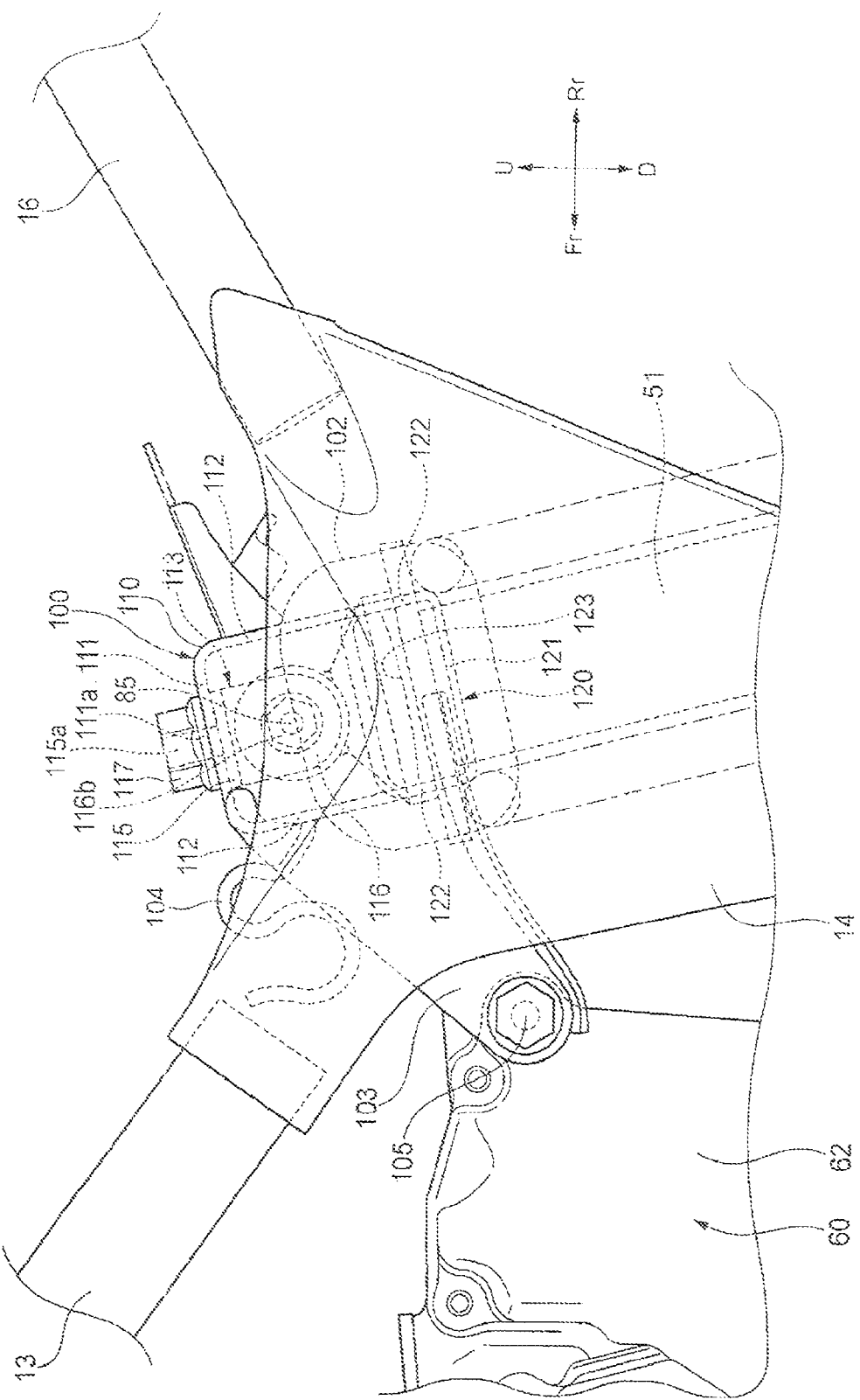
FIG. 10 is an enlarged left side view illustrating a cross member of a saddle-ride type vehicle according to a third embodiment of the present invention.
Figure 11:
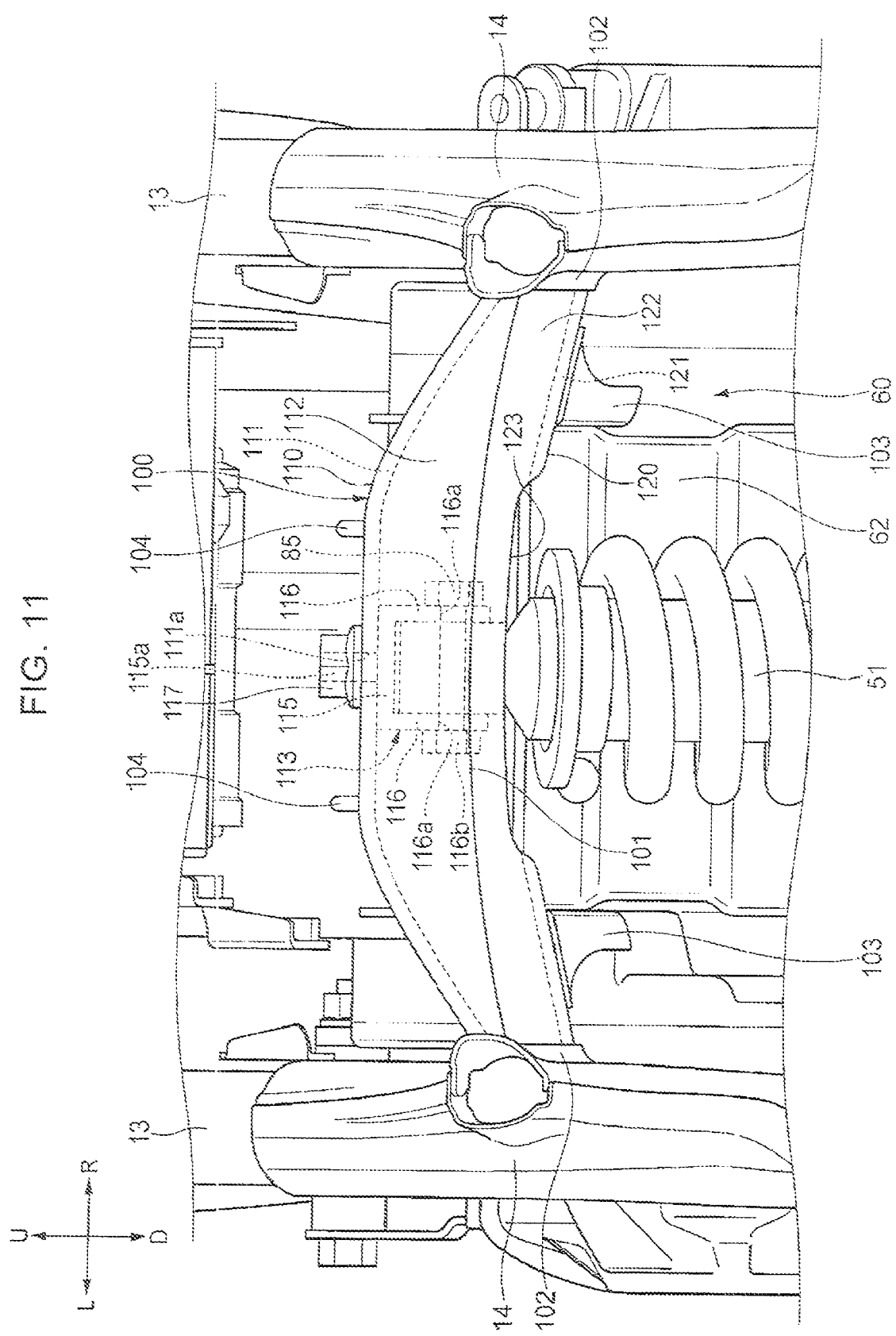
FIG. 11 is a rear view of the vicinity of the cross member shown in FIG. 10.

The motorcycle 10 according to this embodiment uses a cross member (shock absorber support member) 100 instead of the cross member 80 according to the first embodiment. As shown in FIGS. 10 and 11, the cross member 100 is formed as a two-piece vertical-split joint structure of an upper-side cross member 110 and a lower-side cross member 120. The upper-side cross member 110 and the lower-side cross member 120 are coupled together at a vertical joint portion 101 that is curved upwards. Both end portions in the vehicle width direction of the cross member 100 are connected to the inner side in the vehicle width direction of the pivot plates 14 via a connecting member 102 that is a substantially square ring-shaped in side view.

Figure 12:
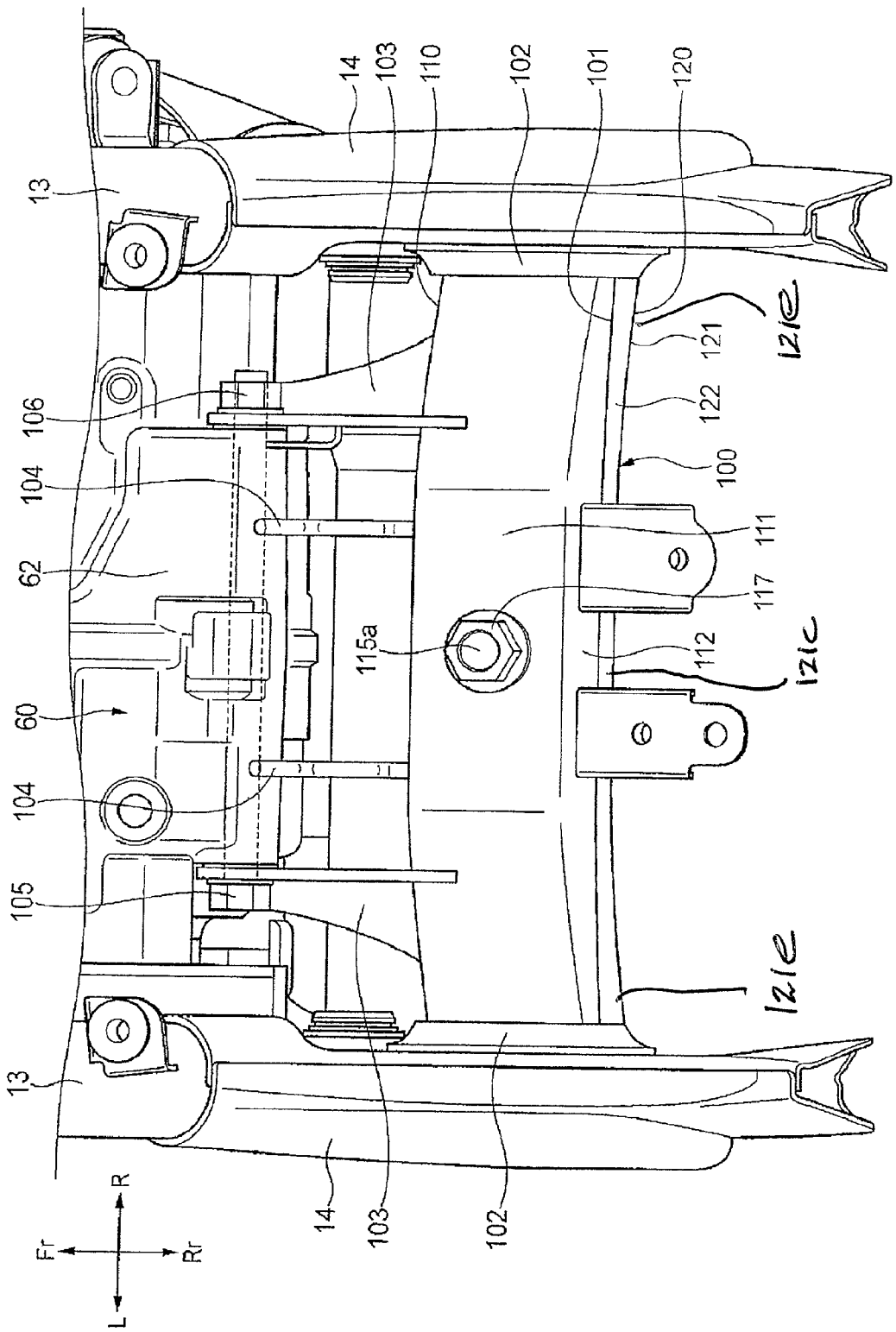
FIG. 12 is a top view of the vicinity of the cross member shown in FIG. 10.

As shown in FIGS. 11 to 13, the upper-side cross member 110 includes an upper plate portion 111 that is provided so as to be suspended between the pair of left and right pivot plates 14 in the vehicle width direction, a pair of front and rear side-plate portions 112 that extend downwards from both the front and rear edges of the upper plate portion 111, and a shock absorber bracket (shock absorber support member) 113 having a substantially inverted U-shape in cross section, which is attached to the central portion in the vehicle width direction of the lower surface of the upper plate portion 111 and supports the upper end portion of the shock absorber 51.

As shown in FIGS. 11 to 13, the lower-side cross member 120 includes a lower plate portion 121 that is provided so as to be suspended between the pair of left and right pivot plates 14 in the vehicle width direction, a pair of front and rear side-plate portions 122 that extend upwards from both the front and rear edges of the lower plate portion 121, and an opening 123 formed in the central portion in the vehicle width direction of the lower plate portion 121 and inserting the upper end portion of the shock absorber 51 into the shock absorber bracket 113.

As shown in FIGS. 11 and 13, the shock absorber bracket 113 is a member obtained by press-molding a plate member into a substantially U shape, and has an upper surface portion 115 and a pair of left and right side surface portions 116. A male screw portion 115a is provided upright on the upper surface of the upper surface portion 115. By passing the male screw portion 115a through a through-hole 111a formed in the central portion in the vehicle width direction of the upper plate portion 111, and bringing a bracket-fixing nut 117 into threaded engagement with the male screw portion 115a, the shock absorber bracket 113 is fastened to the cross member 100. Also, in each of the pair of left and right side surface portions 116, a through hole 116a for the fastening bolt 85 as a shock absorber fastening portion to pass through is formed along the vehicle width direction, and on the outer side surface of the side surface portion 116 on the left side, there is provided a nut 116b which communicates with the though-hole 116a and with which the fastening bolt 85 is brought into threaded engagement.

In this embodiment, as shown in FIGS. 11 to 13, in its cross section taken along the longitudinal direction of the vehicle, the central portion in the vehicle width direction of the cross member 100 is formed in a U-shape that is open at the lower side by the upper plate portion 111, pair of front and rear side-plate portions 112, and pair of front and rear side-plate portions 122 of the upper and lower cross members 110 and 120. Also, the upper plate portion 111 as the upper surface of the cross member 100 and the lower plate portion 121 as the lower surface thereof are each formed so as to be curved in such a way that its central portion 121c in the vehicle width direction lies above the right and left end portions 121e in the vehicle width direction.

Also, as shown in FIGS. 10 to 13, on the front side of the cross member 100, an engine bracket (engine support portion) 103 that supports the engine 60 arranged in front of the cross member 100 is provided as a left and right pair across the shock absorber bracket 113 so as to extend forwards and downwards. Also, as shown in FIGS. 10 and 12, on the front surface of the cross member 100, a pipe guide 104 having a substantially S-shape in a side view for guiding a hydraulic pipe or the like is provided as a left and right pair.

Also, as shown in FIG. 10, a fastening bolt 105 and a fastening nut 106 that serve as an engine fastening portion for fastening the engine 60 and the pair of left and right engine brackets 103 together are arranged below the shock absorber bracket 113 of the cross member 100.

Also, as shown in FIGS. 11 and 13, the opening 123 in the cross member 100 is formed on the central side in the vehicle width direction with respect to the pair of left and right engine brackets 103. Thus, since the strength of the cross member 100 is complemented by the engine 60, the opening 123 can be made larger, thereby allowing a reduction in the weight of the cross member 100. It should be noted that in FIG. 13, a shift pedal 131 is provided together with a brake pedal 132, a main step 133 and a main step holder 134.

As described above, according to the motorcycle 10 in this embodiment, the central portion in the vehicle width direction of the cross member 100 is formed in a U-shape that is open at the lower side in a cross section taken along the longitudinal direction of the vehicle, the upper plate portion 111 and lower plate portion 121 of the cross member 100 are each formed so as to be curved in such a way that its central portion 121c in the vehicle width direction lies above the right and left end portions 121e in the vehicle width direction, and the shock absorber 51 is supported on the central portion in the vehicle width direction of the cross member 100. Thus, since load applied to the cross member 100 can be received by a shear stress and a tensile force, the strength of the cross member 100 can be improved. Also, it is possible to prevent an increase in weight due to strength improvement, thereby achieving a reduction in the weight of the cross member 100.

According to the motorcycle 10 in this embodiment, the engine 60 is arranged in front of the cross member 100, and the engine 60 is supported by the engine bracket 103 provided to the cross member 100. Thus, load applied to the cross member 100 can be borne on the engine 60 side, thereby making it possible to achieve a further reduction in the weight of the cross member 100.

According to the motorcycle 10 in this embodiment, the cross member 100 is formed as a two-piece vertical-split joint structure, the engine bracket 103 is provided as a left and right pair across the shock absorber bracket 113 of the cross member 100, and the opening 123 is provided in a portion of the lower plate portion 121 of the cross member 100 located on the central side in the vehicle width direction with respect to the engine bracket 103. Thus, the rigidity of the portion of the cross member 100 between the pair of left and right engine brackets 103 can be improved by using the engine 60, and a further reduction in the weight of the cross member 100 can be achieved.

According to the motorcycle 10 in this embodiment, the fastening bolt 105 and the fastening nut 106 which fasten the engine 60 and the pair of left and right engine brackets 103 together are arranged below the shock absorber bracket 113. Thus, the compression load on the shock absorber 51 can be transmitted to the engine 60 side by means of the tension load on the engine bracket 103, thereby achieving a reduction in the weight of the engine bracket 103.

Otherwise, the configuration and operational effects of the third embodiment are the same as those according to the first embodiment mentioned above.

It should be noted that the present invention is not limited to those exemplified in the above-mentioned embodiments but can be modified as appropriate without departing from the scope of the present invention.

For example, while the above-mentioned embodiments are directed to the case in which the present invention is applied to a motorcycle, this should not be construed restrictively. The present invention may be applied to a three-wheeled vehicle, or a four-wheeled vehicle such as an all terrain vehicle (ATV).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
a body frame formed as a left and right pair in a vehicle width direction;
a swing arm with one end swingably supported on the body frame;
a rear wheel rotatably supported on the swing arm;
a shock absorber operatively connected to the body frame and the swing arm for applying a damping force to swinging of the swing arm; and
a shock absorber support member operatively provided to be suspended to the body frame in a vehicle width direction for supporting an upper end of the shock absorber; the shock absorber being supported on a central portion in the vehicle width direction of the shock absorber support member;
wherein the shock absorber support includes:
a central portion in the vehicle width direction of the shock absorber support member that is formed in a U-shape that is open at a lower side in a cross section taken along a longitudinal direction of the vehicle; and
an upper surface and a lower surface, each of which is formed so as to be curved in such a way that the central portion of the shock absorber support in the vehicle width direction lies above right and left end portions of the shock absorber support in the vehicle width direction.

2. The vehicle according to claim 1, wherein an engine is arranged in front of the shock absorber support member; and
the engine is supported by an engine support portion secured to the shock absorber support member.

3. The vehicle according to claim 2, wherein the shock absorber support member is formed as a two-piece vertical-split joint structure;
the engine support portion is provided as a left and right pair across a shock absorber support portion of the shock absorber support member; and
an opening is provided in a portion of a lower surface of the shock absorber support member located on a central side in the vehicle width direction with respect to the engine support portion.

4. The vehicle according to claim 3, wherein an engine fastening portion for fastening the engine and the engine support portion together is arranged below the shock absorber support portion.

5. The vehicle according to claim 2, wherein an engine fastening portion for fastening the engine and the engine support portion together is arranged below the shock absorber support portion.

6. The vehicle according to claim 1, wherein the shock absorber support member is formed by arranging a pair of plate-like members so as to be spaced apart in the longitudinal direction of the vehicle;
an upper plate-like member is coupled so as to be suspended between upper portions of the pair of plate-like members in the longitudinal direction of the vehicle; and
a recess having a substantially U-shape in a top view of the vehicle is formed at each of right and left end portions of the upper plate-like member and in the vehicle width direction of the upper plate-like member.

7. The vehicle according to claim 6, wherein in a side view of the vehicle, a shock absorber fastening portion for fastening the shock absorber and the shock absorber support member together faces outwards through the recess.

8. The vehicle according to claim 7, wherein setting the coupling distance between the coupling portion of the pair of plate-like members and the trapezoidal plate-like member and the coupling portion of the trapezoidal plate-like member and the body frame in the lower side of the trapezoidal plate-like member to be larger than the coupling distance between the coupling portion of the pair of plate-like members and the trapezoidal plate-like member and the coupling portion of the trapezoidal plate-like member and the body frame in the upper side of the trapezoidal plate-like member avoids a concentration of stress to permit a weight reduction on the body frame side.

9. The vehicle according to claim 6, wherein the pair of plate-like members are coupled to the body frame via a trapezoidal plate-like member having a long side provided at a lower side of a vehicle body; and a coupling distance between a coupling portion of the pair of plate-like members and the trapezoidal plate-like member and a coupling portion of the trapezoidal plate-like member and the body frame in a lower side of the trapezoidal plate-like member is set larger than a coupling distance between a coupling portion of the pair of plate-like members and the trapezoidal plate-like member and a coupling portion of the trapezoidal plate-like member and the body frame in an upper side of the trapezoidal plate-like member.

10. The vehicle according to claim 1, wherein the shock absorber support member is formed by arranging a pair of plate-like members so as to be spaced apart in the longitudinal direction of the vehicle;
   an upper plate-like member is coupled so as to be suspended between upper portions of the pair of plate-like members in the longitudinal direction of the vehicle; and
   right and left end portions of the upper plate-like member in the vehicle width direction extend down to a lower end of each of the plate-like members.

11. A support for a shock absorber for a vehicle comprising:
   a body frame;
   a swing arm including a first end swingably supported on the body frame;
   a rear wheel rotatably supported on a second end of the swing arm;
   a shock absorber operatively connected to the body frame and the swing arm for applying a damping force to swinging of the swing arm;
   a shock absorber support member connected to the body frame in a vehicle width direction for supporting an upper end of the shock absorber;
   wherein the shock absorber support includes:
   a central portion in the vehicle width direction of the shock absorber support member that is formed in a U-shape that is open at a lower side in a cross section taken along a longitudinal direction of the vehicle; and
   an upper surface and a lower surface, each of which is formed so as to be curved in such a way that the central portion of the shock absorber support in the vehicle width direction lies above right and left end portions of the shock absorber support in the vehicle width direction.

12. The support for a shock absorber for a vehicle according to claim 11, wherein an engine is arranged in front of the shock absorber support member; and
   the engine is supported by an engine support portion secured to the shock absorber support member.

13. The support for a shock absorber for a vehicle according to claim 12, wherein the shock absorber support member is formed as a two-piece vertical-split joint structure;
   the engine support portion is provided as a left and right pair across a shock absorber support portion of the shock absorber support member; and
   an opening is provided in a portion of a lower surface of the shock absorber support member located on a central side in the vehicle width direction with respect to the engine support portion.

14. The support for a shock absorber for a vehicle according to claim 13, wherein an engine fastening portion for fastening the engine and the engine support portion together is arranged below the shock absorber support portion.

15. The support for a shock absorber for a vehicle according to claim 12, wherein an engine fastening portion for fastening the engine and the engine support portion together is arranged below the shock absorber support portion.

16. The support for a shock absorber for a vehicle according to claim 11, wherein the shock absorber support member is formed by arranging a pair of plate-like members so as to be spaced apart in the longitudinal direction of the vehicle;
   an upper plate-like member is coupled so as to be suspended between upper portions of the pair of plate-like members in the longitudinal direction of the vehicle; and
   a recess having a substantially U-shape in a top view of the vehicle is formed at each of right and left end portions of the upper plate-like member and in the vehicle width direction of the upper plate-like member.

17. The support for a shock absorber for a vehicle according to claim 16, wherein in a side view of the vehicle, a shock absorber fastening portion for fastening the shock absorber and the shock absorber support member together faces outwards through the recess.

18. The support for a shock absorber for a vehicle according to claim 17, wherein setting the coupling distance between the coupling portion of the pair of plate-like members and the trapezoidal plate-like member and the coupling portion of the trapezoidal plate-like member and the body frame in the lower side of the trapezoidal plate-like member to be larger than the coupling distance between the coupling portion of the pair of plate-like members and the trapezoidal plate-like member and the coupling portion of the trapezoidal plate-like member and the body frame in the upper side of the trapezoidal plate-like member avoids a concentration of stress to permit a weight reduction on the body frame side.

19. The support for a shock absorber for a vehicle according to claim 16, wherein the pair of plate-like members are coupled to the body frame via a trapezoidal plate-like member having a long side provided at a lower side of a vehicle body; and
   a coupling distance between a coupling portion of the pair of plate-like members and the trapezoidal plate-like member and a coupling portion of the trapezoidal plate-like member and the body frame in a lower side of the trapezoidal plate-like member is set larger than a coupling distance between a coupling portion of the pair of plate-like members and the trapezoidal plate-like member and a coupling portion of the trapezoidal plate-like member and the body frame in an upper side of the trapezoidal plate-like member.

20. The support for a shock absorber for a vehicle according to claim 11, wherein the shock absorber support member is formed by arranging a pair of plate-like members so as to be spaced apart in the longitudinal direction of the vehicle;
   an upper plate-like member is coupled so as to be suspended between upper portions of the pair of plate-like members in the longitudinal direction of the vehicle; and
   right and left end portions of the upper plate-like member in the vehicle width direction extend down to a lower end of each of the plate-like members.

* * * * *